United States Patent [19]
Itai et al.

[11] Patent Number: 5,971,852
[45] Date of Patent: Oct. 26, 1999

[54] IMAGE PROCESSING METHOD AND APPARATUS

[75] Inventors: Katunori Itai; Shunsuke Sekikawa; Masayuki Sumi, all of Tokyo, Japan

[73] Assignee: Kabushiki Kaisha Sega Enterprises, Tokyo, Japan

[21] Appl. No.: 08/596,324

[22] PCT Filed: Jun. 20, 1995

[86] PCT No.: PCT/JP95/01219

§ 371 Date: Oct. 22, 1996

§ 102(e) Date: Oct. 22, 1996

[87] PCT Pub. No.: WO95/35555

PCT Pub. Date: Dec. 28, 1995

[30] Foreign Application Priority Data

Jun. 20, 1994 [JP] Japan .................................. 6-160507

[51] Int. Cl.$^6$ ........................................................ A63F 9/24
[52] U.S. Cl. .......................................................... 463/31
[58] Field of Search .................................. 463/1, 30–33; 364/410; 395/118, 119, 133, 137, 138, 173, 501, 406; 345/121, 112, 113, 114, 115, 116, 122, 123, 419, 433, 473; 348/36, 39, 143; 434/307 R, 43, 38, 63, 69, 44

[56] References Cited

U.S. PATENT DOCUMENTS

| | | |
|---|---|---|
| 4,027,403 | 6/1977 | Marsh et al. . |
| 4,766,423 | 8/1988 | Ono et al. ................................ 345/113 |
| 5,001,663 | 3/1991 | Paraluski et al. ........................ 364/754 |
| 5,003,498 | 3/1991 | Ota et al. ................................. 395/127 |
| 5,395,242 | 3/1995 | Slye et al. ............................ 434/307 R |
| 5,479,597 | 12/1995 | Fellous ..................................... 395/133 |
| 5,583,977 | 12/1996 | Seidt ....................................... 395/133 |

FOREIGN PATENT DOCUMENTS

| | | |
|---|---|---|
| 0 240 608 A3 | 10/1987 | European Pat. Off. . |
| 0 579 451 | 1/1994 | European Pat. Off. . |
| 0 582 815 A3 | 2/1994 | European Pat. Off. . |
| 6-195436 | 7/1994 | Japan . |

OTHER PUBLICATIONS

K. Elsenloffel et al., "Imaging Techniques for Cable Network Structures", International Journal of Imaging Systems and Technology, 2(3):157–168 (1990).

K. Singleton, "An Implementation of The GKS–3D/PHIGS Viewing Pipeline", Computers and Graphics, 11(2):163–183 (1987).

Communication from the European Patent Office transmitting a Supplementary European Search Report, dated Jun. 18, 1998.

*Primary Examiner*—Jessica J. Harrison
*Assistant Examiner*—Mark A Sager
*Attorney, Agent, or Firm*—Finnegan, Henderson, Farabow, Garrett & Dunner, L.L.P.

[57] ABSTRACT

An image processing method and apparatus is provided which is capable of reducing the load to be processed and displaying a more realistic picture. The image processing device includes camera control matrix processing means (121), object matrix processing means (122), and object pattern display means (123). The camera control matrix processing means (121) obtains a matrix of information on the position, etc. of a camera on the basis of control information from the control unit 20 and stores it in a data RAM (104). The object matrix processing means (122) fetches the matrix of information on the camera stored in the data RAM (104), performs coordinate conversion of the matrix of information with the aid of a conversion matrix, and sets rotational components of the coordinate-converted matrix so as to compose a unit matrix thereby creating display data which causes an object such as an explosion pattern to face in an eye direction at all times.

32 Claims, 6 Drawing Sheets

IMAGE PROCESSING METHOD AND APPARATUS

TECHNICAL FIELD

The present invention relates to image processing methods and apparatus applicable to game devices which advance a game on a real time basis by displaying an image on a display, and more particularly to an image processing method and apparatus which effectively uses the hardware resources of a game device.

BACKGROUND ART

Generally, a computer game device which is capable of processing a game on a real time basis includes a game device body which utilizes pre-stored game software, a control unit which gives an operational signal used for processing which includes movement of a character in a game, a display which displays an image which expresses images in the development of a game contained in the game device body, and an acoustic unit which generates the necessary sound as the game proceeds.

Game devices having a clear display screen to providing a more realistic image are popular. Particularly, game devices which use polygon processing are popular as they are capable of expressing three-dimensional image data as a collection of given units providing high visual reality. In a game device using polygon processing, the number of polygons which constitutes an object (a displayed object movable on the display screen) is increased and the polygon surfaces are coated with a texture to thereby further enhance a realistic image.

As just described above, the demand for increasingly more realistic images requires that hardware should have an ability to reduce processing time as well as to process a greatly increased quantity of data on a real time basis, so that the load on the hardware is greatly increased. This demand is expected to continuously increase in the future, thereby increasing the operational load on the hardware.

First of all, the game device is required to perform real-time image processing on the basis of data input by the player, with the basic load on the central processing unit being essentially high compared to sole computer graphics image processing.

In addition, if a game device is composed of a plurality of expensive high-speed operation devices in order to ensure an overwhelming data processing ability such as is present in a flight simulator, the game device would be an expensive commodity and would not satisfy the needs of the market.

As such, conventional game devices must perform image display processing, whilst limiting the processing ability of its processor or the amount of its data capacity. Thus, the resulting image would give insufficient reality to viewers.

In view of the problems with the conventional techniques, it is an object of the present invention to provide an image processing method and apparatus which is capable of reducing the image processing load and displaying an image having greater reality.

Another object of the present invention is to provide an image processing method and apparatus which is capable of reducing the image processing load of an object to be displayed in order to thereby display an image having greater reality.

DISCLOSURE OF THE INVENTION

In order to achieve the above objects, in an image processing method according to the present invention, rotational components of a matrix of an object obtained by coordinate conversion involving a matrix of information on a virtual camera and a version matrix is set so as to form a unit matrix to thereby provide data for the display of the object. The matrix of camera information includes, for example, information on the position and rotation of the camera.

The virtual camera can be compared to a regular camera in that the former has a viewpoint and an image angle involving the delineation of computer graphics. The virtual camera is set by designation of its position, optical axis direction (direction of its lens), image angle (zoom-wide), and twist (rotational angle around the optical axis). In other words, the virtual camera implies a virtually set viewpoint. The virtual camera can be understood as a visual field direction determination means which determines the visual field direction of the image displayed on the video monitor. The object is modeling-converted from a body coordinate system inherent in a figure (object) to a world coordinate system which defines the disposition of the figure in a three-dimensional space. The resulting object image is visual field-converted to one belonging to a visual-field coordinate system determined by (the position and angle) of the virtual camera, with this object image being displayed on the monitor 30.

In addition, preferably, rotational components of a matrix given by $$X = TM$$

which contains information on the travel or movement of an object in a three-dimensional space, where M is a matrix of information on a virtual camera and T is a conversion matrix, are set so as to form the components of a unit matrix to thereby obtain data on the display of the object which faces in an eye direction at all times.

An image processing apparatus according to the present invention includes processing means for performing coordinate conversion of the object on the basis of a matrix of information of a virtual camera and for setting the rotational components of the matrix of the coordinate-converted object as components which compose a unit matrix.

The processing means includes, for example, camera control matrix processing means for obtaining the matrix of information of a virtual camera, and object matrix processing means for obtaining a matrix of information on a point rotated on the basis of the product of the matrix of information of a virtual camera and the conversion matrix and for setting the rotational components of the matrix so as to compose a unit matrix to thereby obtain data relating to the display of the object which faces in the eye direction of the virtual camera at all times.

An image processing apparatus according to the present invention includes storage means for storing information on the position coordinates and angle of a camera and information on the position coordinates of an object, and object matrix processing means for calculating each angle of a three-dimensional coordinate system which causes the object to face in a desired direction on the basis of the information on the position coordinates and angle of the camera and the information on the position coordinates of the object, obtained from the storage means.

In the inventive image processing, the rotational components of the display matrix of the object obtained by the coordinate conversion are set so as to compose a unit matrix. Thus, data on the display of the object which faces in the eye direction of the virtual camera is created at all times. Even when the virtual camera is facing in any direction, the relationship between the camera and the object is such that the object faces the camera at all times. Thus, required data on the object is only (two-dimensional) data to the front of the object, a large amount of data is not required to be handled. Accordingly, the workload of the operation is kept light. The object may be composed of object data displayed in the form of a panel. In addition, this object can be set so as to face in a predetermined direction at all times at a predetermined position. A flat object such as a signboard can be set so as to face in the eye direction at all times. As for the matrix of information on the camera, information on the position and rotation of the camera is selectable depending on information on the operation of the game device as requested.

PREFERRED EMBODIMENTS OF THE INVENTION

One example of the present invention will be described next with reference to the drawings.

Figure 1:
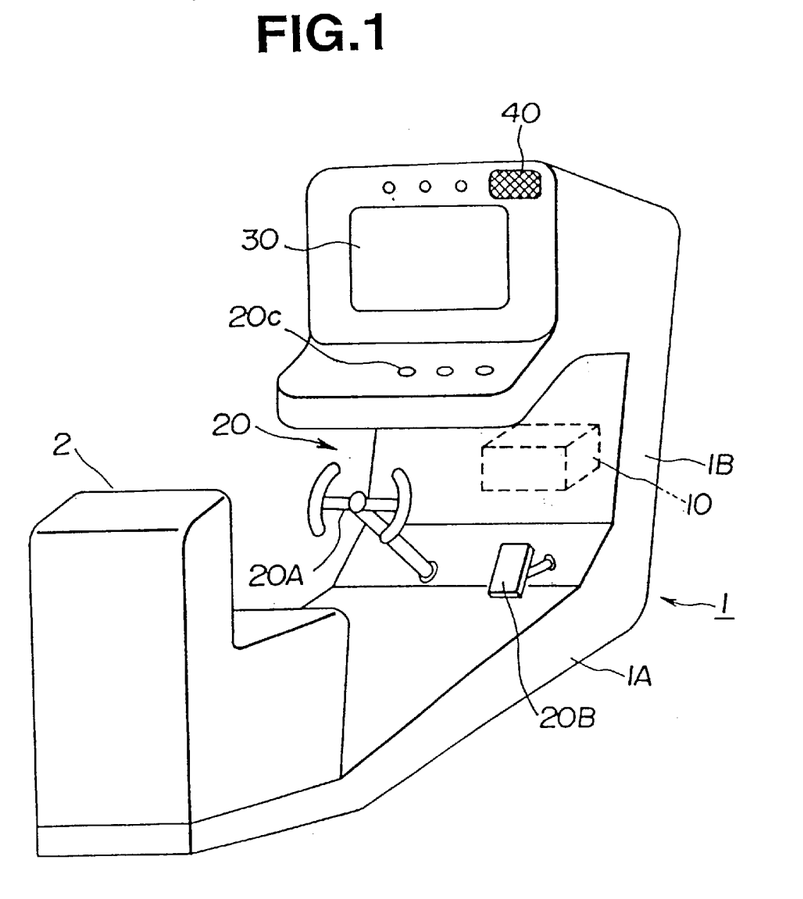
FIG. 1 is a schematic perspective view of a game device according to one embodiment to which the present invention is applied.

FIG. 1 shows a game device to which an image processing method and apparatus according to the present invention is applied. Illustrated is a game device which handles, for example, a war tank game, which includes a pattern of explosions caused when a bullet fired from the war tank strikes a target.

The game device of FIG. 1 has a housing 1 which forms a cockpit. The housing 1 has a bottom 1A and a front 1B which continues to one end of the base 1A so as to be perpendicular to the base. The bottom 1A has a player's seat 2 on which the player sits to manipulate the game device. The front 1B has a game device body 10 therein. Provided in front of the player's seat 2 are a control unit 20 which includes a steering element 20A, an accelerator 20B, a set of switches including a view change switch 20C; a video monitor 30 and a speaker 40 provided on the upper front.

Figure 2:
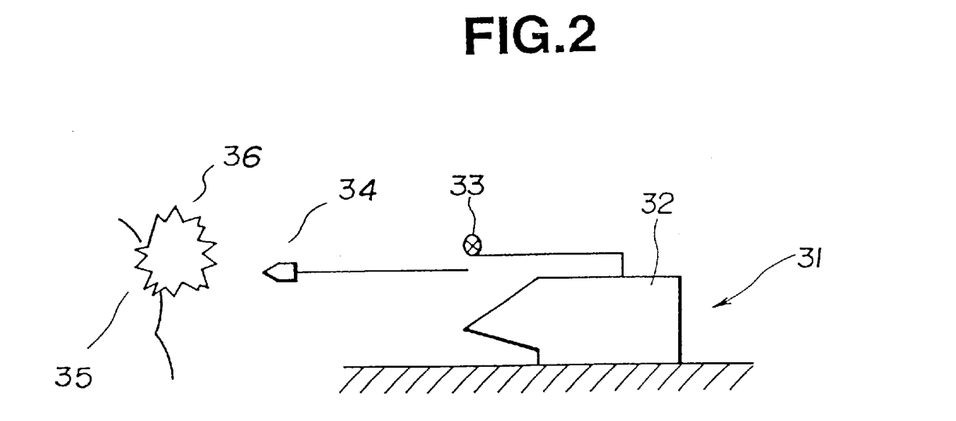
FIG. 2 illustrates objects in the game device.

The game device deals with a war tank game. The steering element 20A is the only control element which gives direction data to the game device. In this tank game the tank 31 is displayed as a traveling or moving object (vehicle). The tank 31 to be displayed can be depicted schematically, as shown in FIG. 2. The tank 31 has a body 32 and a cannon sight 33. When bullet 34 is fired from the tank and hits target 35, a pattern of explosions 36 is displayed.

Figure 3:
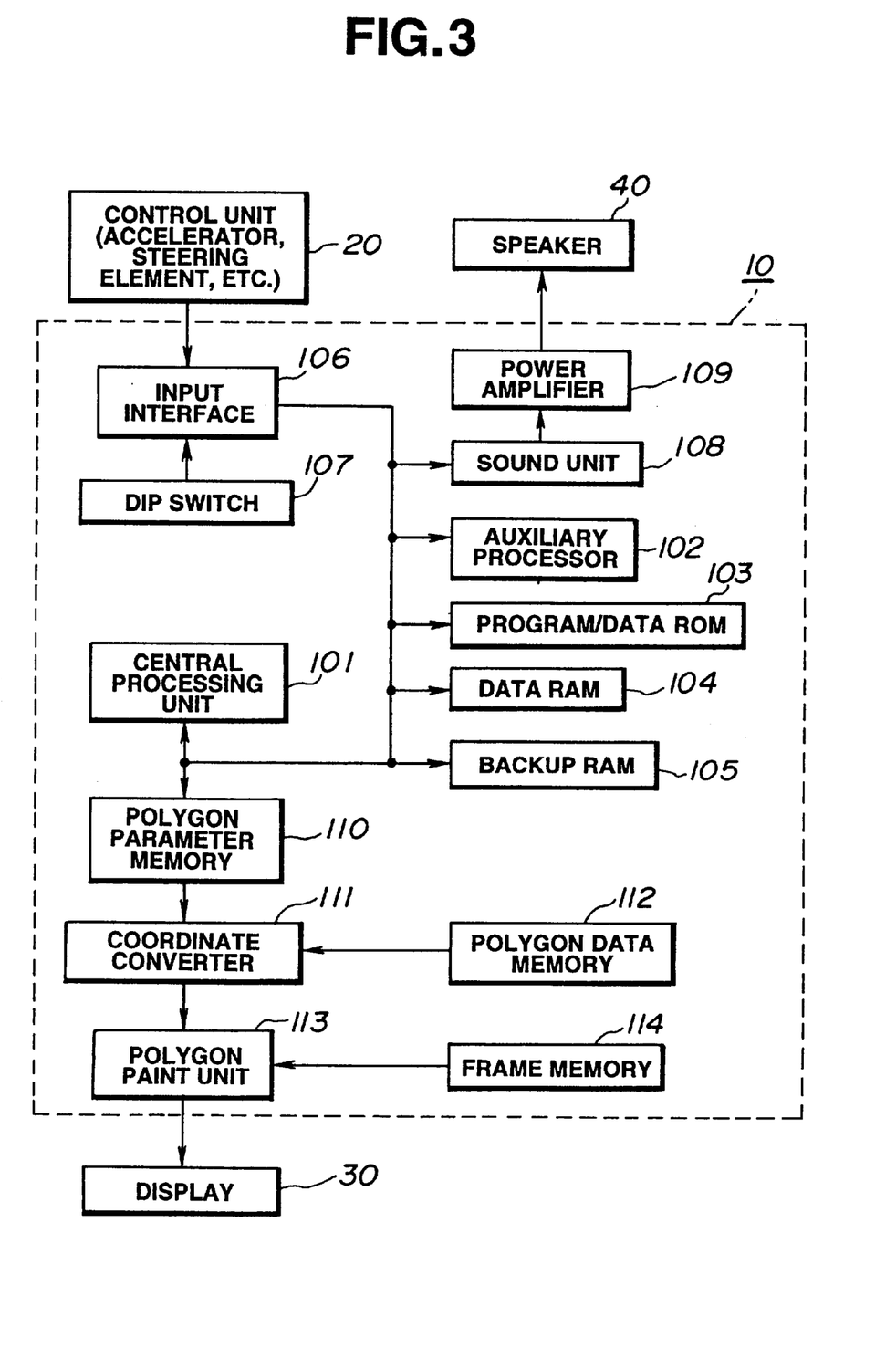
FIG. 3 is an electric block diagram indicative of the outline of the game device.

An electrical block diagram of the game device is shown in FIG. 3. The game device body 10 includes a central processing unit (CPU) 101, an auxiliary processor 102, a program/data ROM 103, a data RAM 104, a backup RAM 105, an input interface 106, a dip switch 107, a sound unit 108, a power amplifier 109, a polygon parameter memory 110, a coordinate converter 111 called a geometrizer, a polygon data memory 112, a polygon paint unit 113 called a rendering unit, and a frame memory 114.

Figure 5:
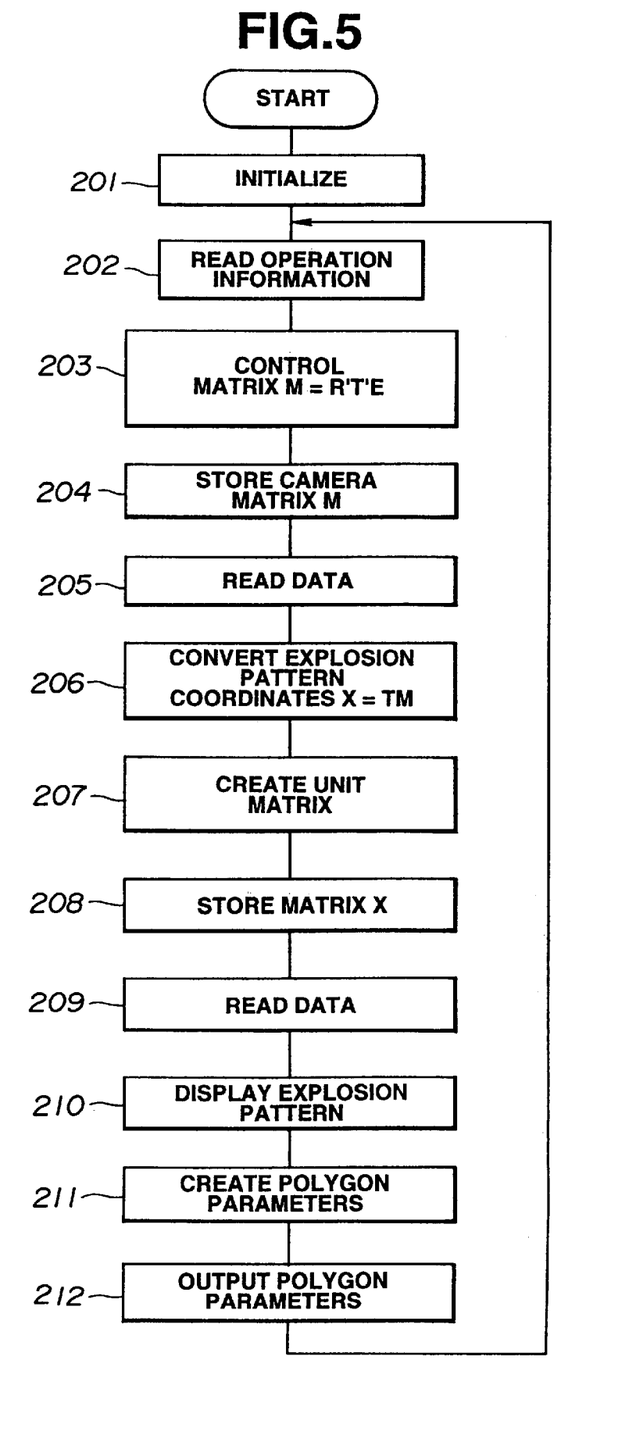
FIG. 5 is a flow chart indicative of the outline of processing performed by the central processing unit.

The central processing unit (CPU) 101 is connected through a bus line to the auxiliary processor 102, program/data ROM 103, data RAM 104, backup RAM 105, input interface 106, sound unit 108, and polygon parameter memory 110. The input interface 106 is connected to the control unit 20 and the dip switch 107. The CPU 101 reads data on a game program contained beforehand in the program/data ROM 103 in cooperation with the auxiliary processor 102 so as to execute the program. The game program contains control of the position, direction and angle of the tank as an object displayed on the video monitor 30 and control of the position and angle of a virtual camera which determines the visual field of the display screen. The outline of the control is shown in FIG. 5.

The sound unit 108 is connected through the power amplifier 109 to the speaker 40. An acoustic signal produced by the sound unit 108 is amplified by the amplifier 109 and delivered to the speaker 40.

A read terminal of the polygon parameter memory 110 is connected to a coordinate conversion unit 111 so that polygon parameters in the memory 110 are delivered to the coordinate conversion unit 111. The coordinate conversion unit 111 is connected to a polygon data memory 112 so as to receive polygon data from the memory 112. The coordinate converter 111 converts three-dimensional polygon coordinates to be displayed to two-dimensional perspective coordinates on the basis of given polygon parameters and polygon data. The output of the coordinate converter 111 is connected to the polygon paint unit 113 such that polygon data on perspective coordinates is delivered to the polygon paint unit 113, which paints the received polygon data with texture data stored in the frame memory 114 to form image data. The output of the polygon paint unit 113 is connected to the video monitor 30 on which the image data formed by the paint unit 113 is displayed.

The accelerator 20B of the control unit 20 outputs an electrical signal indicative of an accelerator opening amount which is reflected in the traveling or moving velocity of the object on the video monitor 30 in response to the player's operation. Similarly, the steering element 20A outputs an electrical signal indicative of a direction θ in which the actions of the object are reflected. The view change switch 20C is a switch with which the player designates the position of the virtual camera which determines the visual field of an image displayed on the video monitor 30.

Figure 4:
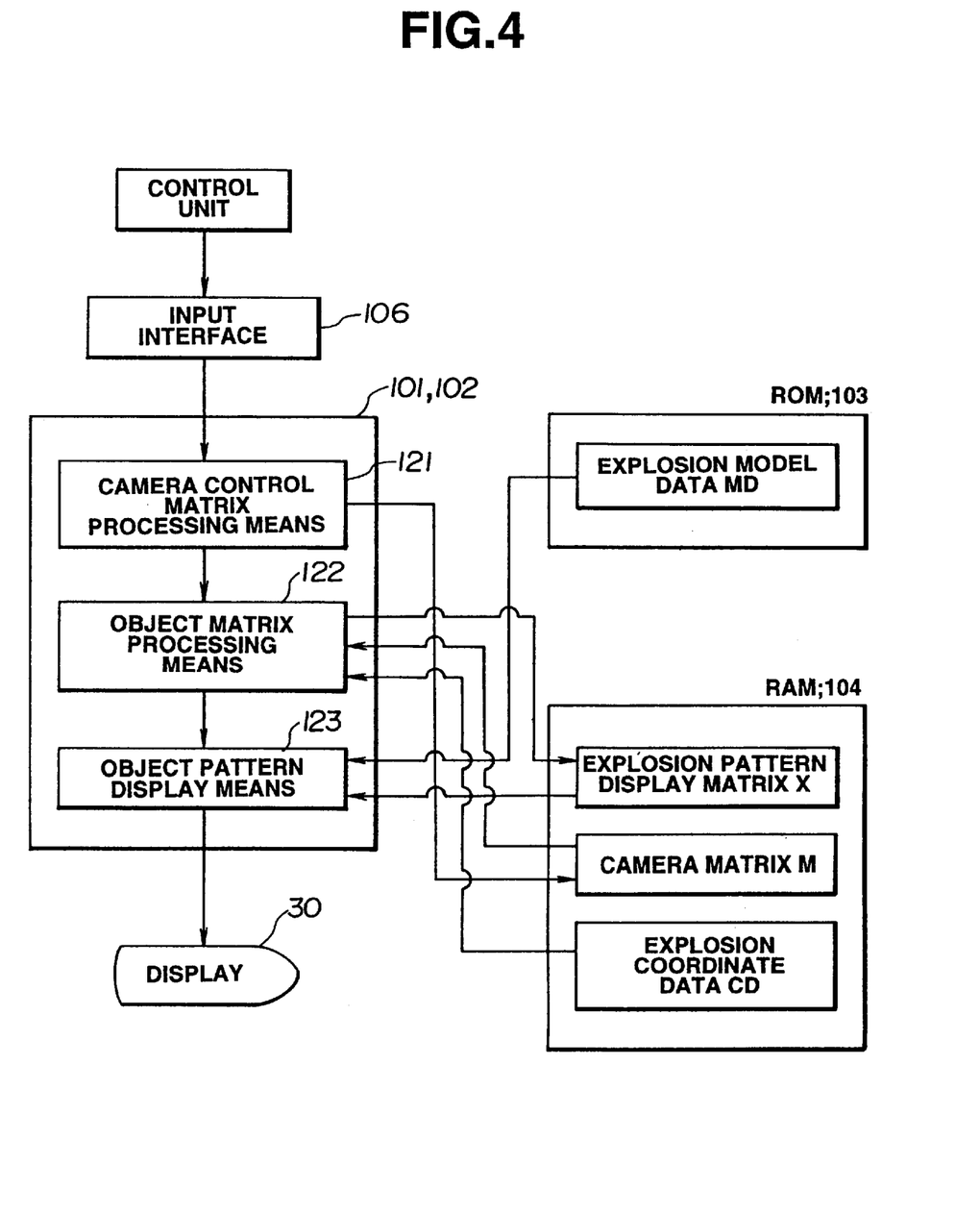
FIG. 4 is a functional block diagram of a central processing unit and the peripheral devices of the game device.

The central processing unit 101 cooperates with the auxiliary processor 102 to execute a game program, which includes the image processing method of the present invention, stored in the program/data ROM 103, as shown in FIG. 4, to thereby functionally realize camera control matrix processing means 121, object matrix processing means 122, and object pattern display means 123. The program/data ROM 103 contains explosion model data MD composed of polygon vertex data which determines the shape of an explosion pattern (object). The data RAM 104 contains an explosion pattern display matrix X, and a camera matrix M and explosion coordinate data CD which is position data where an explosion occurs, and, for example, central position coordinates of the explosion model data MD.

As will be described later, the central processing unit 101 controls the position and rotation of a virtual camera which determines an eye direction in accordance with a control input from the control unit 20, stores its camera matrix M in the data RAM 104, fetches the camera matrix M and the explosion coordinate data CD, performs operations to convert the coordinates of the explosion pattern (object) and sets the rotational components of a matrix of the explosion pattern in a unit matrix to form an explosion pattern display matrix X, and temporarily stores this matrix in the data RAM 104. In addition, the central processing unit 101 performs an explosion pattern display process on the basis of the explosion model data MD stored in the program/data ROM 103 and an explosion pattern display matrix X stored in the data RAM 104. Thus, the resulting data is delivered to the polygon parameter memory 110 and finally to the display 30. The central processing unit 101 calculates the central position of the explosion pattern in accordance with operation information (not shown) as requested, and updates the value of the explosion coordinate data CD in the data RAM 104 at that time.

The operation of this embodiment will be described principally concentrating on a display process for an explosion pattern as an object with reference to FIGS. 5–7. For the explosion pattern, image data on its front portion should be used.

The game device 1 starts the operation of the game device body 10 in response to the turning-on operation of a power supply, so that the central processing unit 101 performs the process shown in FIG. 5 in cooperation with the auxiliary processor 102.

First, the central processing unit 101 performs a predetermined initializing operation (step 201). The central processing unit 101 then reads from the control unit 20 operation information such as the angle of the steering element turned by the player and the accelerator opening, (step 202), and executes a control operation of a matrix (camera matrix) M about virtual camera information on the basis of the read information (step 203).

This control operation is given by $$M = R'T'E \qquad [\text{Ex. 1}]$$

where E is a basic matrix of the position of the virtual camera, T' is a movement conversion matrix, R' is a rotation conversion matrix, and M is a matrix (camera matrix) having camera position information.

The control operation will be described specifically below. In the present embodiment, the action of the tank 31 is controlled by the steering element 20A and the accelerator 20B. Assume therefore that the virtual camera views a scene from the viewpoint of the tank. Thus, the position of the tank can be regarded as the position of the camera (Xp, Yp, Zp), and the rotational angle of the tank can be regarded as the rotational angle of the camera (Xa, Ya, Za). Thus, the travel or movement of the tank due to the accelerator operation is reflected as a change in the camera position (Xp, Yp, Zp) and the rotation of the tank by the steering operation is reflected as a change in the rotational angle of the camera (Xa, Ya, Za).

In this case, the rotational conversion matrix R' is given by the matrix operation of [Ex. 2], and the movement conversion matrix T' is given by the matrix operation of [Ex. 3]. The matrix operation expressions of [Exs. 2 and 3] are described later. The operation expressions or their values of [Ex. 4] and subsequent expressions are described similarly later.

Since a unit matrix E is expressed by [Ex. 4], the product of the three matrixes of [Exs. 2–4] is a camera matrix M (=R'T'E).

Data on the calculated camera matrix M is then stored in the data RAM 104 (step 204).

The central processing unit 101 then reads the explosion coordinate data CD from the program/data ROM 103 and the camera matrix M from the data RAM 104 (step 205). Thereafter, the central processing unit 101 performs coordinate conversion of the explosion pattern which comprises the explosion pattern process (step 206). That is, the central processing unit performs the next matrix operation:

$$X = TM$$

where T is a movement conversion matrix based on the current camera matrix M and the explosion coordinate data CD to thereby obtain an explosion pattern display matrix X on a travel or movement of the explosion pattern in a three-dimensional space.

More specifically, when the position of the camera is expressed as (Tx, Ty, Tz), the explosion pattern display matrix X is expressed by [Ex. 5]. Assume in the movement conversion matrix T that its first row is [1 0 0 0], that its second row is [0 1 0 0], that its third row is [0 0 1 1], and that its fourth row is [Tx Ty Tz 1]. By calculating X=TM, using these figures, X is obtained which has the first row [a b c 0], a second row [d e f 0], a third row [g h i 0], and a fourth row [A B C 1]. Thus, by this coordinate conversion process, a matrix based on the movement of the virtual camera is obtained.

In this embodiment, since no rotation conversion matrix R is used by reason of simplification of a calculation to be described later, what is calculated is only X=TM. By calculating X=TM, the matrix X on camera information has the value of [Ex. 6].

When the value of the explosion pattern display matrix X is calculated, as describe above, the central processing unit 101 performs an operation in which the rotational components of the matrix X are set as components of a unit matrix (step 207 of FIG. 5). The respective values of the components a–i of the expression comprise rotation information. Thus, if the rotation information is set as values which compose a unit matrix, as shown in [Ex. 7] below, the rotation information would be lost and the explosion pattern display matrix X necessarily expresses a non-rotation state.

If the object (here, explosion pattern) can face the player in a non-rotated state, the appropriate object can be set so as to face the player (in the eye direction) always at a desired position. That is, an explosion pattern display matrix X of the object which faces in a desired direction along the eye direction of the camera is formed at all times. Even when the image pick-up direction of the camera is set in any direction, the object is set at all times so as to face the camera.

The explosion pattern display matrix X is temporarily stored in the data RAM 104 (step 208).

Thereafter, the explosion pattern display matrix X is read from the data RAM 104, and the explosion model data MD from the ROM 103 (step 209). Then, the explosion pattern display process is performed (step 210). In this display process, display data is created as the product of the explosion pattern display matrix X and polygon vertex data read from the explosion model data MD.

The central processing unit 101 creates polygon parameters and outputs this data to the polygon parameter memory 110 (steps 211, 212).

Thereafter, control returns to step 202. By repeating the above, a matrix M of desired camera information is obtained, and a matrix X which is the product of the camera information matrix M and the conversion matrix T is calculated. By setting the rotational components of the matrix X as components which compose a unit matrix, display data is obtained in which the explosion pattern faces in the eye direction at all times.

Data on the object which includes the explosion pattern, thus obtained, is delivered through the polygon parameter memory 110 to the coordinate conversion unit (geometrizer) 111, which creates display data at required display coordinates and delivers the data to the polygon paint unit (rendering unit) 113. The polygon paint unit 113 applies texture data obtained from the frame memory 114 to the display data to thereby provide display data which includes ornamented polygon data, which is then delivered to the display 30 for displaying purposes.

In the process of FIG. 5, steps 202–204 constitute the camera control matrix processing means 121 of FIG. 4. Steps 205, 206 forms the object matrix processing means of FIG. 4. Steps 207–210 forms the object pattern display means 123 of FIG. 4 equivalently.

Another matrix calculation of the camera matrix X at step 206 will be described now for the purpose of comparison. Assume that the object travels or moves in the three-dimensional space. In this case, an object display matrix X having rotation information at a position to which the object has traveled or moved is given by $$X = RTM$$

where R is a rotation conversion matrix and where T is a movement conversion matrix, which is similar to [Ex. 5] mentioned above.

A specified calculation example of the rotation conversion matrix R in the coordinate conversion process will be described. First, assume that the matrix M is, for example, a 4×4 matrix where elements are a, b, c, . . . , k, 1, as shown in [Ex. 8]–[Ex. 10].

Assume that the rotation conversion matrix Rx has a first row [1 0 0 0], a second row [0 cos θ sin θ 0], a third row [0 −sin θ cos θ 0], and a fourth row [0 0 0 1]. By calculating X=Rx M, using this matrix, X is obtained which has a first row [a b c 0], a second row [A B C 0], a third row [D E F 0] and a fourth row [j k l 1]. As the result of this calculation, the capital letter elements of X are ones influenced by the rotation matrix Rx. Thus, the coordinate conversion has provided a matrix X due to the rotation of the virtual camera with reference to the X-axis direction.

Similarly, as shown in [Ex. 9], assume that the rotation conversion matrix Ry has a first row [cos θ 0 −sin θ 0], a second row [0 1 0 0], a third row [sin θ 0 cos θ 0], and a fourth row [0 0 0 1]. By calculating X=Ry M, using this matrix, X is obtained which has a first row [G H I 0], a second row [d e f 0], a third row [J K L 0] and a fourth row [j k l 1]. As the result of this calculation, the capital letter elements of X are ones influenced by the rotation matrix Ry. Thus, the coordinate conversion has provided a matrix X due to the rotation of the virtual camera with reference to the y-axis direction.

Similarly, as shown in [Ex. 10], assume that the rotation conversion matrix Rz has a first row [cos θ sin θ 0 0], a second row [−sin θ cos θ 0 0], a third row [0 0 1 0], and a fourth row [0 0 0 1]. By calculating X=Rz M, using this matrix, X is obtained which has a first row [M N O 0], a second row [P Q R 0], a third row [g h i 0] and a fourth row [j k l 1]. As the result of this calculation, the capital letter elements of X are ones influenced by the rotation matrix Rz. Thus, the coordinate conversion has provided a matrix X due to the rotation of the virtual camera with reference to the z-axis direction.

As described above, a matrix X having rotational components is obtained by the product of the camera matrix M and the rotation conversion matrix R.

Subsequently, the operational effects of the present invention will be described specifically with reference to FIGS. 6 and 7.

First, for comparison, assume that the rotation conversion matrix R of the object is introduced and object matrix processing for X=RTM has been performed.

Figures 6A, 6B:
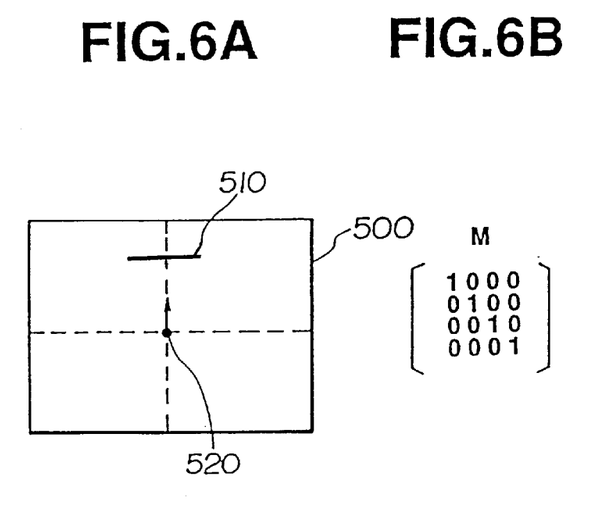
FIGS. 6A–6C illustrate one example of image processing.
Figure 6C:
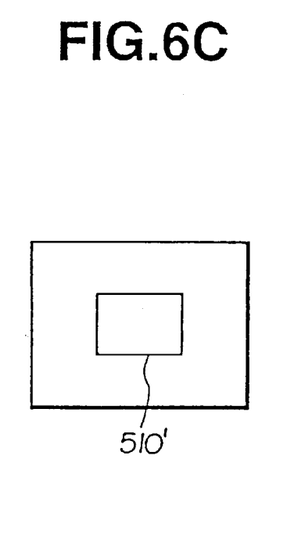

Now, as shown in FIG. 6A, assume that an object 510 has been disposed above the center of an area 500 and that the viewpoint 520 of the virtual camera faces upward from the center. If a camera matrix M=R' T' E, where E is a unit matrix, is calculated, the resulting matrix M has a first row [1 0 0 0], a second row [0 1 0 0], a third row [0 0 1 0] and a fourth row [0 0 0 1], as shown in FIG. 6B. Thus, when X=RTM is calculated and the object 510 is observed from the camera viewpoint 520, a rectangular object 510' is obtained, as shown in FIG. 6C. As just described, an object 510 having a predetermined size is obtained as an image facing in a predetermined direction by calculation of X=RTM.

Figure 7A:
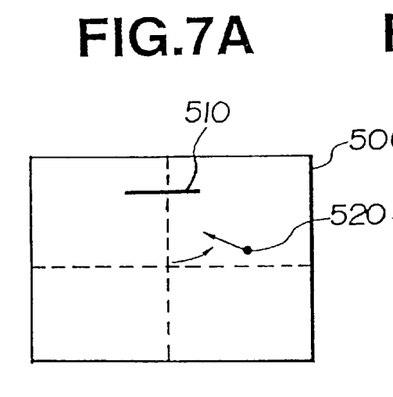
FIGS. 7A–7C illustrate one example of image processing.

Now, as shown in FIG. 7A, assume that an object 510 has been disposed above the center of an area 500 and that the viewpoint 520 of the virtual camera faces from the left bottom to the right top. If a camera matrix M=R' T' E where E is a unit matrix is calculated, the resulting matrix M has a first row [A B C 0], a second row [D E F 0], a third row [G H I 0] and a fourth row [a b c 1], as shown in FIG. 7B. Thus, when X=RTM is calculated and the object 510 is observed from the camera viewpoint 520, a trapezoid object 510' smaller towards the left and larger towards the right is obtained, as shown in FIG. 7C. As just described, the object 510' is considered in on the basis of information on the position and rotation of the camera to provide a predetermined image.

In contrast, the case where calculation of X=TM which is a simple object matrix process employed in the present embodiment will be described next.

Assume now that the area 510 of FIGS. 6A and 7A contains a rectangular polygon. In FIG. 6A, the rectangular polygon 510 is expressed by four vertex parameters:

P1(X1, Y1, Z1), P2(X2, Y2, Z2),

P3(X3, Y3, Z3), P4(X4, Y4, Z4).

Assume that FIG. 7A shows a state in which the camera has moved and rotated. The four vertexes P1–P4 are converted by a camera matrix obtained as M=R' T' E to parameters (vertexes) P1', P2', P3', and P4', which are expressed as:

$$P1' = P1 \cdot M, \quad P2' = P2 \cdot M,$$

$$P3' = P3 \cdot M, \quad P4' = P4 \cdot M.$$

Figure 7B:
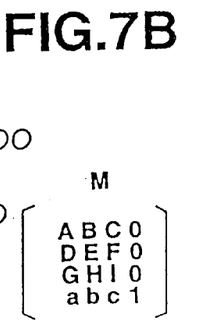
Figure 7C:
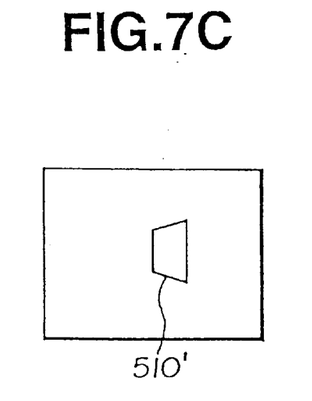

If those parameters are expressed as they are, a matrix of FIG. 7C would be obtained.

Let M' be a matrix obtained by setting rotation information expressed by A, B, C, D, E, F, G, H, I of a camera matrix M of FIG. 7B in the corresponding components which constitute a unit matrix. The four vertexes are then converted to:

$$P1''=P1 \cdot M', \ P2''=P2 \cdot M',$$

$$P3''=P3 \cdot M', \ P4''=P4 \cdot M',$$

By displaying the conversion data P1", P2", P3" and P4", a rectangular polygon of FIG. 7C is displayed so as to face in the eye direction shown in FIG. 7A. In summary, by forming a unit matrix with rotation information, the positional relationship of FIG. 6A is maintained where the rectangular polygon 510 faces the camera at all times.

As just described above, in the present embodiment, a matrix M of virtual camera information depending on the control provided by the control unit 20 is calculated, the coordinate conversion X=TM is then performed, and the rotational components of the matrix X are processed so as to have the components of a unit matrix. Thus, by the pseudo-operation based on the unit matrix, the explosion pattern is set so as to be at 90 degrees at all times to the eye of the virtual camera. Thus, the whole image of the explosion pattern can be expressed, using only front data on the explosion pattern. That is, since the object can be moved depending on the viewpoint of the camera, using only data on a predetermined partial area of the explosion pattern, the object can be expressed three-dimensionally, using only data on the predetermined area of the explosion pattern. When the explosion pattern display matrix X is calculated, a time-consuming operation on the rotation of an explosion pattern using a rotation conversion matrix R is rendered useless due to a pseudo-operation using a unit matrix. Thus, the quantity of data required for operation for movement and display of the object involved in the movement of the viewpoint is reduced, the quantity of display data to be handled is also reduced, and hence the calculation load is reduced thereby achieving high-speed calculation. Since the object is moved depending on the movement of the viewpoint, the object can be expressed as if the object is three-dimensional, by using only data on a part of the object such as front data. Thus, a high-quality image is expressed.

While in the embodiment the game which includes an object for image processing in the present invention is assumed to be a tank game, the game may be one which shoots solely at an automatically traveling or moving target with a gun. While the explosion pattern has been illustrated as the object, the object may be any object. For example, the objects may be particular enemy tanks or a particular background in the tank game. Alternatively, the objects may be standing signboards. According to the present invention, the objects can be directed at all times so as to face the eye direction and the operation load is reduced, advantageously.

Figure 8:
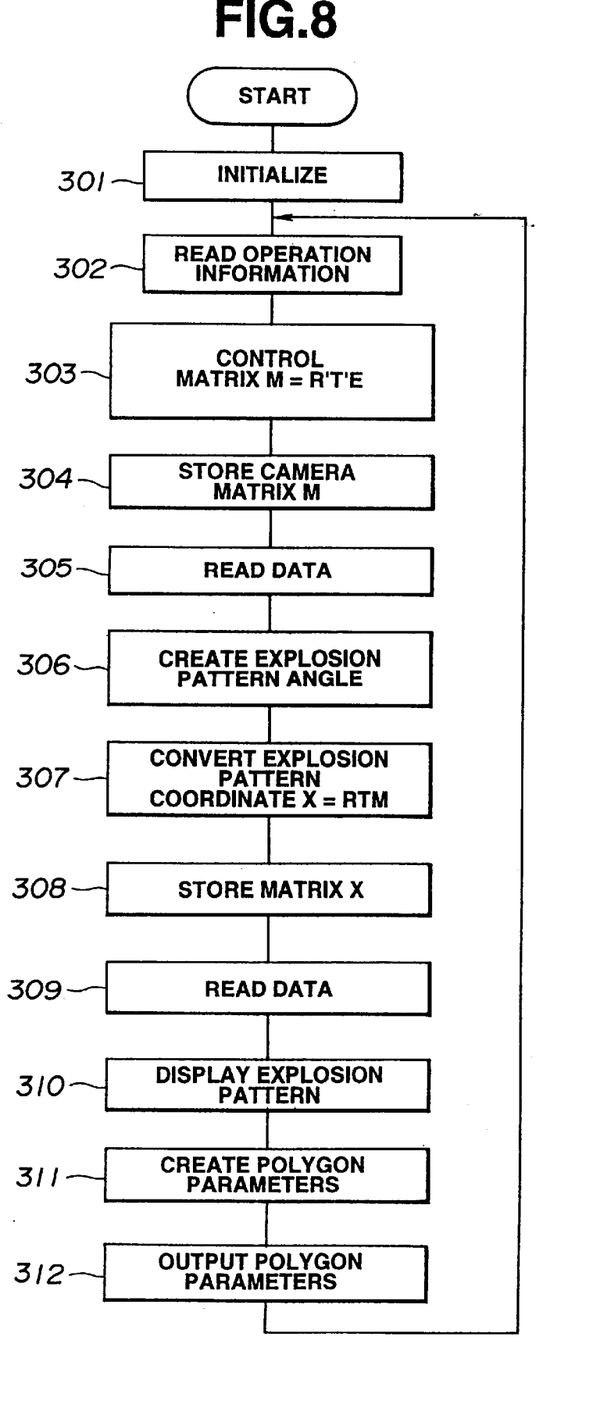
FIG. 8 is a flow chart indicative of the outline of the processing performed by a central processing unit of a game device according to when another embodiment of the present invention is applied.

Furthermore, another embodiment of the present invention will be described with reference to FIG. 8.

This embodiment has a structure equal to that of the previous embodiment which handles the tank game. The central processing unit 101 performs the process of FIG. 8.

In this embodiment, information on the coordinates of the position of a camera and its angle is obtained in a camera control matrix process. In addition, in order to direct the object accurately in the eye direction in the object matrix operation, a rotational angle of the object about the three-dimensional coordinate axes is calculated on the basis of the position of the object and the position and rotational angle of the camera.

The process of FIG. 8 will be described. First, after a predetermined initialization, the central processing unit 101 obtains data (Cx, Cy, Cz) on the position of the camera relative to the origin of three-dimensional coordinates and data (Ax, Ay, Az) on the angle of the camera as a camera control matrix process (steps 301–303). Here, for example, Ax shows an angle through which the camera has rotated relative to the x axis of the three-dimensional coordinates. Also, Ay and Az show corresponding angles through which the camera has rotated relative to the y and z axes, respectively. The position data (Cx, Cy, Cz) and angle data (Ax, Ay, Az) on the camera are stored in the data RAM 104 as a camera matrix M which is the result of the calculation of M=R'T'E (step 304).

When the respective data is obtained in this way, explosion coordinate data CD is fetched from the RAM 104 to provide object position coordinates (Ox, Oy, Oz) and angle data for causing the explosion pattern to face accurately in the eye direction is created in the object matrix operation (steps 305, 306). The creation of the angle data on the explosion pattern is performed with respect to the y, x and z axes as follows. The rotational angle Yang of the y axis is calculated by:

$$Yang=\tan^{-1}[(Ox-Cx)/(Oz-Cz)] \qquad [\text{Ex. 11}]$$

where (Ox–Cx) is the distance in x-axis direction between the coordinates of the object and the camera and (Oz–Cz) is the distance in z-axis direction between the coordinates of the object and the camera.

A rotational angle Xang of the x axis is calculated by $$Xang=\tan^{-1}[\{(Ox-Cx)\sin(Yang)+ \\ (Oz-Cz)\cos(Yang)\}/(Oy-Cy)] \qquad [\text{Ex. 12}]$$

The rotational angle Zang of the z axis is calculated by $$Zang=Az \qquad [\text{Ex. 13}]$$

When angle data (Yang, Xang, Zang) for directing the explosion pattern accurately in the eye direction in the object matrix operation is calculated, the coordinate conversion of the explosion pattern is performed by the calculation X=RTM, using the angle data (Yang, Xang, Zang) and the resulting data X is stored (steps 307, 308). Thereafter, as in the above, data required for the display process is read, and display of the explosion pattern, creation of polygon parameters, and outputting the polygon parameters are performed (steps 309–312).

As just described above, the display process is performed with display data which causes the explosion pattern and the flat object to face accurately in a desired direction (in the eye direction), so that the objects face in the eye direction at all times. For example, a signboard as a flat object can be directed so as to face the eye direction at all times. In the present embodiment, the object can be set so as to face accurately in a desired direction (in the eye direction) at all times on the basis of data on the position of the object and data on the position and angle of the camera.

$$R' = \begin{bmatrix} 1 & 0 & 0 & 0 \\ 0 & \cos Xa & \sin Xa & 0 \\ 0 & -\sin Xa & \cos Xa & 0 \\ 0 & 0 & 0 & 1 \end{bmatrix} \begin{bmatrix} \cos Ya & 0 & -\sin Ta & 0 \\ 0 & 1 & 0 & 0 \\ \sin Ya & 0 & \cos Ya & 0 \\ 0 & 0 & 0 & 1 \end{bmatrix} \begin{bmatrix} \cos Za & \sin Za & 0 & 0 \\ -\sin Za & \cos ZA & 0 & 0 \\ 0 & 0 & 1 & 0 \\ 0 & 0 & 0 & 1 \end{bmatrix} \quad [\text{Ex. 2}]$$

$$T' = \begin{bmatrix} 1 & 0 & 0 & 0 \\ 0 & 1 & 0 & 0 \\ 0 & 0 & 1 & 0 \\ Xp & Yp & Zp & 1 \end{bmatrix} \quad [\text{Ex. 3}]$$

$$E = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad [\text{Ex. 4}]$$

$$\begin{array}{ccc} T & M & X \end{array} \quad [\text{Ex. 5}]$$
$$R' = \begin{bmatrix} 1 & 0 & 0 & 0 \\ 0 & 1 & 0 & 0 \\ 0 & 0 & 1 & 0 \\ Tx & Ty & Tz & 1 \end{bmatrix} \begin{bmatrix} a & b & c & 0 \\ d & e & f & 0 \\ g & h & i & 0 \\ j & k & l & 1 \end{bmatrix} \rightarrow \begin{bmatrix} a & b & c & 0 \\ d & e & f & 0 \\ g & h & i & 0 \\ A & B & C & 1 \end{bmatrix}$$

$$\begin{bmatrix} a & b & c & 0 \\ d & e & f & 0 \\ g & h & i & 0 \\ A & B & C & 1 \end{bmatrix} \quad [\text{Ex. 6}]$$

where $A = aTx + dTy + gTz + j$
$B = bTx + eTy + hTz + k$
$C = cTx + fTy + iTz + l$ $$\begin{bmatrix} a \rightarrow 1 & b \rightarrow 0 & c \rightarrow 0 \\ d \rightarrow 1 & e \rightarrow 1 & f \rightarrow 0 \\ g \rightarrow 1 & h \rightarrow 1 & i \rightarrow 1 \end{bmatrix} \quad [\text{Ex. 7}]$$

$$\begin{array}{ccc} Rx & M & X \end{array} \quad [\text{Ex. 8}]$$
$$\begin{bmatrix} 1 & 0 & 0 & 0 \\ 0 & \cos\theta & \sin\theta & 0 \\ 0 & -\sin\theta & \cos\theta & 0 \\ 0 & 0 & 0 & 1 \end{bmatrix} \begin{bmatrix} a & b & c & 0 \\ d & e & f & 0 \\ g & h & l & 0 \\ j & k & l & 1 \end{bmatrix} \rightarrow \begin{bmatrix} a & b & c & 0 \\ A & B & C & 0 \\ D & E & F & 0 \\ j & k & l & 1 \end{bmatrix}$$

$$\begin{array}{ccc} Rx & M & X \end{array} \quad [\text{Ex. 9}]$$
$$\begin{bmatrix} \cos\theta & 0 & -\sin\theta & 0 \\ 0 & 1 & 0 & 0 \\ \sin\theta & 0 & \cos\theta & 0 \\ 0 & 0 & 0 & 1 \end{bmatrix} \begin{bmatrix} a & b & c & 0 \\ d & e & f & 0 \\ g & h & l & 0 \\ j & k & l & 1 \end{bmatrix} \rightarrow \begin{bmatrix} G & H & I & 0 \\ d & e & f & 0 \\ J & K & L & 0 \\ j & k & l & 1 \end{bmatrix}$$

$$\begin{array}{ccc} Rz & M & X \end{array} \quad [\text{Ex. 10}]$$
$$\begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix} \begin{bmatrix} a & b & c & 0 \\ d & e & f & 0 \\ g & h & l & 0 \\ j & k & l & 1 \end{bmatrix} \rightarrow \begin{bmatrix} M & N & O & 0 \\ P & Q & R & 0 \\ g & h & i & 0 \\ j & k & l & 1 \end{bmatrix}$$

We claim:

1. A game device comprising:
   image processing means for displaying a three-dimensional coordinate space including a plurality of objects as a two-dimensional image seen from a prescribed viewpoint, wherein said plurality of objects contain an object of said three-dimensional coordinate space formed into a two-dimensional object; and
   means for arranging said two-dimensional object to face in a prescribed direction relative to said viewpoint when said two-dimensional object is within a field of view of said viewpoint.

2. A game device according to claim 1, wherein said image processing means comprises means for arranging said two-dimensional object so that one side of the object faces in a direction of view of said viewpoint.

3. A game device according to claim 2, wherein said image processing means comprises an object rotation display means for displaying a rotated view of said two-dimensional object so that one side of the object faces in the direction of view of said viewpoint.

4. A game device according to one of claims 1, 2 or 3, wherein said two-dimensional object is defined by image data of only one side.

5. A method for producing in an image processing apparatus a view of an object represented by image data in a virtual three-dimensional space, the method comprising the steps of:

providing image data indicative of one side of the object defined in the virtual three-dimensional space;

determining in the virtual three-dimensional space positional coordinates of a view point and an eye direction from said view point to define a displayed view;

modifying rotational coordinates of the object in response to a change in the eye direction from said view point with respect to the object so that said one side of the object is kept displayed at all times when the object is within a field of view from said view point, wherein said change corresponds to movement of a virtual camera; and generating image data for displaying a view of said one side of the object based on said modified rotational coordinates.

6. The method of claim 5, wherein the rotational coordinates of the object are modified so that said one side of the object faces in a direction along said eye direction.

7. The method of claim 5, wherein the object is defined two-dimensionally in the virtual three-dimensional space.

8. The method of claim 7, wherein the rotational coordinates of the object are modified so that a normal line of said one side of the object defined two-dimensionally faces in a direction along said eye direction.

9. The method of claim 5, wherein the object is defined by the image data defining said one side of the object and image data lacks for sides of the object other than said one side of the object.

10. An image processing apparatus for producing a view of an object represented by image data in a virtual three-dimensional space, the apparatus comprising:

means for providing image data indicative of one side of the object defined in the virtual three-dimensional space;

means for determining in the virtual three-dimensional space positional coordinates of a view point and an eye direction from said view point to define a displayed view;

means for modifying rotational coordinates of the object in response to a change in the eye direction from said view point with respect to said object so that said one side of the object is kept displayed at all times when the object is within a field of view from said view point, wherein said change corresponds to movement of a virtual camera; and means for generating image data for displaying a view of said one side of the object based on said modified rotational coordinates.

11. The apparatus of claim 10, wherein the rotational coordinates of the object are modified so that said one side of the object faces in a direction along said eye direction.

12. The apparatus of claim 10, wherein said object is defined two-dimensionally in the virtual three-dimensional space.

13. The apparatus of claim 12, wherein the rotational coordinates of the object are modified so that a normal line of said one side of the object defined two-dimensionally faces in a direction along said eye direction.

14. The apparatus of claim 10, wherein the object is defined by the image data defining said one side of the object and image data lacks for other sides of the object other than said one side of the object.

15. A game device comprising:

means for providing image data defining a plurality of objects in a virtual three-dimensional space, said plurality of objects including a particular object defined by data of one view side;

means for determining in said virtual three-dimensional space positional coordinates of a view point and an eye direction from said view point to define a displayed view; and means for modifying rotational coordinates of said particular object in response to a change in said eye direction from said view point with respect to said particular object so that said one view side of the particular object is kept displayed at all times when said particular object is within a field of view from said view points wherein said change corresponds to movement of a virtual camera.

16. The game device of claim 15, wherein said particular object is defined two-dimensionally in said virtual three-dimensional space.

17. The game device of claim 16, wherein said modifying means modifies the rotational coordinates of said particular object so that a normal line of said one view side of the two-dimensionally defined object faces in a direction along said eye direction.

18. The game device of claim 16, wherein said modifying means modifies the rotational coordinates of said particular object so that a normal line of said one view side of the two-dimensionally defined object faces said eye direction.

19. The game device of claim 15, wherein said modifying means modifies the rotational coordinates of said particular object so that said one view side of the particular object faces in a direction along said eye direction.

20. The game device of claim 15, wherein said object is defined by image data defining said one view side of the particular object and image data lacks for other sides of the particular object other than said one view side.

21. A method executed by an image processing apparatus with a control unit manipulatable by a player for controlling movement of an object in a virtual three-dimensional space, the method comprising the steps of:

providing image data indicative of a plurality of objects in said virtual three-dimensional space, said plurality of objects including a particular object defined by data defining one view side thereof;

determining in said virtual three-dimensional space positional coordinates of a view point and an eye direction from said view point to define a displayed view; and modifying rotational coordinates of the particular object in response to a change in the eye direction from said view point with respect to said particular object so that said one view side of the particular object is kept displayed at all times when said particular object is positioned within a field of view from said view point, wherein said change corresponds to movement of a virtual camera.

22. A method executed by an image processing apparatus with a control unit controlled by a player for controlling movement of an object in a virtual three-dimensional space, the method comprising the steps of:

providing image data indicative of a plurality of objects in said virtual three-dimensional space, said plurality of objects including a particular object defined two-dimensionally with data defining one view side thereof;

determining positional coordinates of a view point and an eye direction from said view point in said virtual three-dimensional space to define a displayed view; and modifying rotational coordinates of said particular object in response to a change in the eye direction from said view point with respect to said particular object so that said one view side of the particular object faces in a direction along said eye direction at all times when said particular object is positioned within a field of view from said view point, wherein said change corresponds to movement of a virtual camera.

23. The game software storing method of claim 22, wherein said modifying means modifies the rotational coordinates of the particular object so that a normal line of said one view side faces in a direction along said eye direction.

24. The game software storing method of claim 22, wherein the rotational coordinates of the particular object are modified so that a normal line of said one view side faces said eye direction.

25. A game device comprising:

means for providing image data defining a plurality of objects in a virtual three-dimensional space, said plurality of objects including a particular object defined two-dimensionally in said virtual three-dimensional space with data defining one view side;

means for determining in said virtual three-dimensional space positional coordinates of a view point and an eye direction from said view point to define a displayed view; and means for modifying rotational coordinates of said particular object in response to a change in said eye direction from said view point with respect to said particular object so that said one view side of the particular object is kept displayed at all times when said particular object is within a field of view from said view point, wherein said change corresponds to movement of a virtual camera.

26. The game device of claim 25, wherein said modifying means modifies the rotational coordinates of said particular object so that said one view side of the particular object faces in a direction along said eye direction.

27. The game device of claim 25, wherein said modifying means modifies the rotational coordinates of said particular object so that said one view side of the particular object faces said eye direction.

28. A game device comprising:

means for providing image data defining a plurality of objects in a virtual three-dimensional space, said plurality of objects including a particular object defined two-dimensionally in said virtual three-dimensional space with data defining a front view thereof;

view determination means for determining in said virtual three-dimensional space positional coordinates and an image pick-up direction of a virtual camera to define a displayed view; and coordinate modification means for modifying rotational coordinates of said particular object in response to a change in said image pick-up direction of said virtual camera with respect to said particular object so that said front view side of the particular object is kept displayed at all times when said particular object is within a field of view of said virtual camera, wherein said change corresponds to movement of a virtual camera.

29. The game device of claim 28, wherein said coordinate modification means comprises means for modifying the rotational coordinates of said particular object so that a normal line of said front view faces in a direction along said image pick-up direction when data of the objects disposed in said virtual three-dimensional space are converted to a visual field coordinates system determined by said view determination means.

30. A game software storing medium for use with an image processing apparatus with a control unit controlled by a player for controlling movement of an object in a virtual three-dimensional space, said game software storing medium storing programs for executing the steps of:

providing image data indicative of a plurality of objects in a virtual three-dimensional space, said plurality of objects including a particular object defined by data of one view side thereof;

determining in said virtual three-dimensional space positional coordinates of a view point and an eye direction from said view point to define a displayed view; and modifying rotational coordinates of the particular object in response to a change in the eye direction from said view point with respect to said particular object so that said one view side of the particular object is kept displayed at all times when said particular object is positioned within the field of view from said view point, wherein said change corresponds to movement of a virtual camera.

31. A game software storing medium for an image processing apparatus with a control unit controlled by a player for controlling movement of an object in a virtual three-dimensional space, said game software storing medium storing programs for executing the steps of:

providing image data indicative of a plurality of objects in a virtual three-dimensional space, said plurality of objects including a particular object defined two-dimensionally with data of one view side thereof;

determining positional coordinates of a view point and an eye direction from said view point in said virtual three-dimensional space to define a displayed view; and modifying rotational coordinates of said particular object in response so a change in the eye direction from said view point with respect to said particular object to that said one view side of the particular object faces in a direction along said eye direction at all times when said particular object is positioned within the field of view from said view point, wherein said change corresponds to movement of a virtual camera.

32. A game software storing medium of claim 31, wherein said modifying step includes a step of modifying the rotational coordinates of the particular object so that a normal line of said one view side faces in a direction along said eye direction.

* * * * *